United States Patent [19]

Webster et al.

[11] 4,028,130
[45] June 7, 1977

[54] DISPOSAL METHOD AND USE OF SEWAGE SLUDGE

[75] Inventors: William C. Webster; Robert G. Hilton; Ronald F. Cotts, all of Norristown, Pa.

[73] Assignee: IU Conversion Systems, Inc., Philadelphia, Pa.

[22] Filed: Nov. 15, 1974

[21] Appl. No.: 524,148

Related U.S. Application Data

[63] Continuation-in-part of Ser. Nos. 494,338, Aug. 2, 1974, abandoned, and Ser. No. 420,364, Nov. 30, 1973, abandoned.

[52] U.S. Cl. ............................ 106/120; 210/52; 210/66; 61/35; 106/118; 106/DIG. 1
[51] Int. Cl.$^2$ ............................................. C04B 1/00
[58] Field of Search ............... 61/35; 106/118, 119, 106/120, DIG. 1, 287 SS; 210/10, 18, 42, 45, 47, 52, 53, 59, 66, 67

[56] References Cited

UNITED STATES PATENTS

| | | | |
|---|---|---|---|
| 154,093 | 8/1874 | Scott | 106/119 |
| 2,942,993 | 6/1960 | Handy et al. | 106/DIG. 1 |
| 3,030,222 | 4/1962 | Eichenlaub | 106/DIG. 1 |
| 3,342,731 | 9/1967 | Baumann et al. | 210/45 |
| 3,720,609 | 3/1973 | Smith et al. | 106/109 |
| 3,870,535 | 3/1975 | Minnick et al. | 106/118 |

FOREIGN PATENTS OR APPLICATIONS

| | | |
|---|---|---|
| 23,839 | 10/1969 | Japan |

OTHER PUBLICATIONS

Lea et al., The Chemistry of Cement and Concrete, 1956, pp. 363–365.
Eye, D. J. and Basu, T. K.; "The Use of Flyash in Wastewater Treatment and Sludge Conditioning", Journal of WPCF, vol. 42, No. 5, May 1970, pp. R125–R135.
Helm et al., Environmental Aspects of Compacted Mixtures of Fly Ash and Wastewater Sludge", 48th Annual Conf. of the Water Pollution Control Fed., Oct. 10, 1975.
Kawam et al., "Feasibility of Using Sewage Sludge in Highway Embankment Construction", Feb. 1975, Interim Report, Report No. FHWA-RD-75-38, Fed. Highway Admin., Wash., D.C.
Gerlich, J. W., "Flyash as a Filter Aid", Power Engineering, Jan. 1970, pp. 44 to 45.
Gerlich, J. W., "Pressure Filtration-Municipal Wastewater Solids, Cedar Rapids, Iowa", Proc. of the Nat'l. Conf. on Municipal Sludge Management, June 11–13, 1974, pp. 77 to 85.
Tenney, M. W. and Cole, T. G., "The Use of Flyash in Conditioning Biological Sludge for Vacuum Filtration", Journal WPCF, vol. 40, No. 8, Aug. 9, 1968, p. R281t.
Pressure Filtration of Waste Water Sludge with Ash Filter Aid, U.S. EPA Environmental Protection Technology Series EPA-R2-73-231, June 1973.
Sludge Dewatering by Pressure Filtration by Hans W. Forester, Beloit-Passavant Corp., Birmingham, Ala.

*Primary Examiner*—Winston A. Douglas
*Assistant Examiner*—John P. Sheehan
*Attorney, Agent, or Firm*—Miller & Prestia

[57] ABSTRACT

Digested sewage sludge resulting from sewage plant treatment of municipal sewage is disposed of and used in an ecologically acceptable manner by the incorporation of such sludge in hardenable compositions further including, for example, lime, fly ash and, in some cases, alkaline earth metal sulfates and/or soil or other inert or complimentary additives. These hardenable compositions may be emplaced in an area open to the atmosphere and permitted to cure over a period of time to act as land fill or as road base materials.

32 Claims, No Drawings

DISPOSAL METHOD AND USE OF SEWAGE SLUDGE

This application is a continuation-in-part application of U.S. applications Ser. Nos. 494,338, filed Aug. 2, 1974 now abandoned and 420,364 filed Nov. 30, 1973, now abandoned, of common inventorship and assignment herewith.

This invention pertains to methods of disposing of and using municipal sewage plant waste materials, more particularly the digested sewage sludge resulting from treatment in a conventional manner of municipal sewage, by the combination of such sludge with certain types of cementitious reactants and the possible further additions of other compounds or inert materials; the invention also pertains to the treated compositions and the hardened products thereof.

In a typical primary sewage treatment plant, raw sewage is permitted to settle; the underflow is then digested anaerobically in a chamber closed to the atmosphere with a temperature on the order of 95° F. Residence time of the sewage in this chamber is generally from about 5 to 30 days. Digested, coagulated underflow or sludge is removed from the bottom of this chamber. Bacteriological activity and heavy metal constituents in this sludge are just two of a number of potentially harmful characteristics which must be considered in its disposition, treatment or storage.

In some sewage plants, the effluent of the "primary" treatment or settling process is subjected to aerobic digestion, such as by aeration or trickle filter treatment. This "secondary" treatment may also include sludge recycling in which case the sludge product is usually referred to as "activated sludge". Secondary sludge is generally stabilized or non-putrescible as a result of the aerobic bacteriological breakdown of the less stable organic compounds in the primary effluent. To the extent that this breakdown is not completed in the secondary treatment and that such unstable organic compounds remain in the secondary sludge, it may also be anaerobically digested, along with the primary sludge. Disposal of this secondary sludge is thought to present problems similar to those described above with reference to primary sludges.

Prior to the present invention, sewage sludge has been used as an agricultural fertilizer, sintered (sometimes in combination with fly ash) for use in cement products, dumped at sea or ponded in waste lagoons. Each of these disposal methods involves serious disadvantages.

The general object of the present invention is to provide a useful process for disposing of digested sewage sludge in an ecologically and economically acceptable manner. Additional objectives are to provide processes for utilizing such sludge products to produce useful hardenable materials, to use such hardenable compositions produced in this manner, to prevent the ecological damage caused by certain present disposal methods, and to reclaim the land areas now occupied by sewage sludge lagoons.

More specifically, it is an object of this invention to provide a practical process for admixing digested sewage sludge with relatively inexpensive materials to produce hardenable compositions which may in turn be used as landfill or structural base materials.

Accordingly, in the present invention, digested sewage sludge is admixed with hydrated lime and fly ash such that the resultant composition includes (all following percentages based on weight percent of solids): 5-50% water, 1-15% lime, (or equivalent materials, as discussed below) 1-50% sewage sludge solids, 20-90% fly ash, (or equivalent material, as discussed below) 0-60% soil and 0-10% calcium sulfate (usually, though not necessarily, in the anhydrite form). This hardenable composition may be placed in a suitable site, open to the atmosphere, where landfill or a road base is needed and permitted to harden over a period of time. Depending on the composition and the intended use of the landfill or road base, compaction may be required, prior to hardening.

Alternatively, other sources of alkaline earth metal hydroxides, such as Basic Oxygen Furnace (BOF) waste dust, waste lime kiln dust or cement kiln dust may be used in place of lime and other sources of pozzolanically active materials and/or aluminum or ferric ions may be used in place of fly ash. Typical materials which may be used as a supplement to, or in place of, fly ash include waste "alum" (such as the waste by-product of a water treatment plant), "red mud" (the high aluminum content waste by-product of chemical bauxite reduction processes) and the amorphous siliceous residue of waste incinerators, particularly petroleum refinery waste incinerators.

Finely divided, water quenched blast furnace slag may also be included in these compositions as a cementitious reactant.

Preferably, the method and product of this invention involves such admixtures wherein the composition comprises, based on weight % of solids, 15-30% water, 2-6% lime, 4-20% sewage sludge solids, and 30-80% fly ash.

Preferably also these compositions include (based on weight % of the solids) calcium sulfate (1.5-3% based on the anhydrite) and 20-45% soil.

For a better understanding of this invention, reference is made to the following detailed description of this invention and the claims of this application appended hereto.

Digested sewage sludge is the anaerobically or aerobically digested product of a municipal sewage treatment plant. Such a plant may also include coagulation and settling processes. A final product of these plants consists of a wet sludge with a solids content in the range of 3-8% by weight. After these sludges have been ponded for any length of time, their solids content may be somewhat higher and may even approach 35% after extended periods.

Generally, the present invention involves incorporation of such waste sludge materials in a matrix, comprised primarily of alumino-siliceous material, such as fly ash. The chemical reactions which occur are largely responsible for tying up substantial quantities of water from the sludge and encapsulating or otherwise fixing or structurally stabilizing the sludge solids so as to render them relatively non-reactive and non-leachable. The degree of non-reactivity or non-leachability and indeed the strength of the resulting products depend on numerous variables, including the proportions of reactants, sludge solids and water in the compositions, its degree of compaction, etc. If the reactants are fairly concentrated and the composition is compacted prior to reaction, the product of this stabilization or fixation process is a hard, monolithic landfill or base material. On the other hand, if the cementitious reaction occurs in a sufficiently dilute and/or non-compacted and/or in combination with sufficient quantities of other interspersed materials, such as soil, the hardening reaction takes place only on a localized scale within the mass and the product is non-monolithic and granular or soil-like in consistency. Such a granular, non-monolithic product, may serve as a landfill and in some instances be superior to ordinary soil as a low compressive strength sub-base material with highly desirable storability, emplacibility, compactibility, and moisture tolerability characteristics.

Having in mind these possible variations, it should be understood that "hardenable", "hardened" and "cementitious" and like terms, as used herein are intended to encompass all forms of the cementitious stabilization reaction which is an integral part of the present invention. These terms, therefore are not limited to the formation of a hard, monolithic mass.

Referring now to the nature of the materials used in the present invention, sewage sludge solids are the materials remaining when all water is removed from such a sludge. To the extent that the present invention is defined in terms of compositions including certain amounts of such sewage sludge "solids", this is usually determined by determining the solids content of the sewage sludge prior to the addition of such sludge to the hardenable mixture. "Solids content" as used herein refers to the solids fraction remaining when water in the sludge is driven off by heating the sludge to about 100° F. for 24 hours while exposing it to a circulating air atmosphere at about the same temperature. This figure may also be determined by analyzing the final product for constituents contributed by other starting materials, including water and calculating the difference between the composition's total weight and the total weight of the constituents attributable to sources other than the sludge.

Chemically, the compositions of these waste sludges encompass a wide variety of organic and inorganic materials; apparently excluded, however, are highly soluble low molecular weight sugar-type compounds. Heretofore, cement materials such as those incorporated in the mixes of the present invention were not considered to be useful in combination with typical organic materials. For reasons not altogether understood, this is found not to be the case in the present invention, which is based on the admixture of the sewage sludge with pozzolanic cements, typically including lime and fly ash and further usually including sulfates and inert materials such as soil or aggregate. The absence of sugar-type organic compounds in the sewage sludge waste products to which the present invention is directed is thought to be a significant factor in the surprising results obtained in the invention by the combination of such pozzolanic materials with such organic waste products.

Other possibly significant factors which may contribute to the surprising compatability of digested sewage sludges with the cementitious reactants are the metal ions and cellulosic content of these sludges.

These metal ions may include heavy metals, such as zinc, chromium, lead and mercury, which are normally most difficult to dispose of in an ecologically acceptable manner and other metal ions such as aluminum and ferric, some of which may be added as a coagulant at some stage in the treatment process. All of these ions, and particularly the aluminum and ferric ions, may participate in the cementitious reaction and therefore facilitate the integral combination of sludge solids with cementitious materials upon which the present invention is based. Indeed, it appears that only sludges which have been chemically modified, such as by the addition of coagulants, may be stabilized at the higher sludge and water proportions and lower matrix constituent proportions of the present invention.

The cellulosics content in sewage sludge may also be significant. Ordinarily, this is thought to comprise about 5–25% of the sludge solids. The cellulosics are generally fibrous and the hydroxyl content of the cellulosics may facilitate surface or hydrogen bonding of the cellulosics in sludge with the cementitious materials so that they actually act as a reinforcement within the cementitious matrix.

The present invention also depends on the incorporation of fly ash or equivalent materials into the admixture with the waste sludge product. Fly ash, which is a well known waste material usually recovered from the stack gases of pulverized coal-burning furnaces, is a finely divided material including some unburned carbon, but mostly comprised of various silica, alumina and iron compounds present in a variety of forms, including finely divided spherical glassy particles.

To the extent other materials may be substituted for fly ash, the amounts of such materials required (the "fly ash equivalent amount") must be determined largely by trial and error due to the peculiar nature of such materials and the variation in possible objectives, with regard, for example, to speed of reaction, ultimate compressive strength, end use, et cetera. These "fly ash equivalent amounts" of these alternative materials, such as those mentioned above, may be approximated, however, by tests, such as the "Pozzolanic Activity Test With Lime" procedure of ASTM Test Method C-618 and the Available Aluminum-Ferric Ion Test Procedure of U.S. Pat. No. 3,720,609. The latter test is most useful when a significant amount of sulfate is included in the cementitious mixture while the former should be used if no significant amount of sulfate is to be included. For this purpose, a "significant amount of sulfate" is considered, based on the total composition, to be about 0.5% by weight, of calcium sulfate anhydrite or molar equivalent amounts of other alkaline earth metal sulfate compounds. Within the range 0.5–2% sulfate, both of the above tests may be necessary to determine the "fly ash equivalent amount" of some other material which may be used in place of fly ash. Generally, "fly ash equivalent amount" refers to the amount of concentration of a fly ash substitute which provides a reactivity corresponding to that of some specific amount, concentration or range of fly ash.

The "lime" included in the compositions of the present invention may be ordinary hydrated dolomitic or high calcium lime or any variety of mixtures of such hydrated limes. In addition, the lime reactant may consist, in whole or in part, of a variety of other materials which include available and reactive alkaline earth metal hydroxides or oxides, in a form hydratable to the hydroxides. Such other materials include quicklime (hydratable calcined dolomite or limestone), cement kiln dust and lime kiln dust (which normally contains 25–35 weight % reactive calcium or magnesium oxides) and BOF dust. If a material other than hydrated lime comprises part or all of the "lime" content in the compositions and processes of this invention, the concentration of the lime substitute necessary is calculated on the basis of the weight percent of that material necessary to provide an amount of available or reactive alkaline earth metal oxides or hydroxides equal (on a molar basis to that which would be provided by hydrated lime within the limits of the present invention.)

Finely divided, water quenched blast furnace slag, may reduce somewhat the lime required in the compositions and processes of this invention. In general, this is due to the tendency of the amorphous siliceous components of these materials to act as a hydraulic cement, forming hydrated silicates and ettringite. Lime is not required in these reactions.

In the preferred mixes of the present invention, and particularly those in which soil or other inert material is incorporated or those intended for use as road base material (as opposed to landfill, where less strength is required) the inclusion of alkaline earth metal sulfates is highly desirable. While these sulfates may be any of a variety of calcium or magnesium sulfates in either the hydrated or unhydrated form, the preferred material simply due to its availability, is calcium sulfate dihydrate.

The mixes of the present invention may, of course, also include a variety of other either inert or complimentary materials. Such inert materials may function to absorb water, contribute strength, add early hardening characteristics, or simply provide bulk. Such materials may include soil, aggregate, and portland cement. Possible additional complimentary materials include sulfite compounds, or compostions including such compounds, which may enhance or promote the cementitious reactions.

The proportions of materials in the compositions and processes of the present invention may be varied within relatively wide limits.

For example, with respect to water, sufficient water must be present to permit reaction between ions of the various cementitious materials. As a minimum, 5% moisture content (water = 5% of the total weight of solids) is thought to be required, (although at lower moisture content, below about 35%, within the allowable range, it may be necessary to compact the cementitious admixture to permit it to harden). On the other hand, the moisture content may be as high as 50% (water = 50% of solids or 33-⅓% of total composition). Beyond that concentration, excessive water may cause such dilution of cementitious materials as to interfere with the necessary cementitious reaction. Preferably, the moisture content is within the range from 15 to 30% by weight. At higher moisture contents, and particularly approaching the 50% maximum, higher fly ash and lime proportions are necessary in the composition to tie up the additional water. If an extraordinarily high proportion of cementitious reactants are present or if the sewage sludge contributes significantly to the cementitious reaction, such as by the inclusion of aluminum or ferric ions in a coagulant additive, higher moisture content may be tolerable. In some experiments, compositions with moisture contents approaching 100% have been stabilized with sludge solids making up on the order of 50% of the total composition.

Generally, the lime should be present in the cementitious admixture to the extent of 1—15% (all percentages based on weight % of the solids). Economic feasibility is the primary consideration in setting this upper limit. Preferably, the lime content is in the range of 2-6% by weight. To the extent materials other than ordinary hydrated lime, dolomitic or high calcium lime are used, materials having available reactive alkaline earth metal hydroxides or hydratable alkaline earth metal oxides should be included based on their molar equivalency to the above defined required proportions of lime.

For the pozzolanic reaction upon which the present invention is based, the admixture of the present invention should include at least 20% fly ash, although 30% is preferred. The upper limit for fly ash is in the neighborhood of about 90%, although 80% is preferred as the upper limit. Even higher fly ash contents may be practical in some situations due to the chemical nature of the fly ash or the end use specifications. It will be understood that the fly ash in excess of that necessary for the cementitious reaction acts as a filler or water absorption agent or both.

As a practical matter, the compositions of the present invention, and those resulting from the methods of the present invention, should include a significant amount of digested sewage sludge solids, since it is the primary object of the present invention to dispose of and to use such solids. Therefore, while this invention encompasses such compositions to a lower limit of sludge solids of 1%, a minimum of 4%, by weight, is preferred. Generally, the upper limit on such solids may be as high as 50% and an upper limit of 20% is preferred. (As before, all percentages are based on wieght % of solids unless otherwise indicated.) As with water, at higher sludge solids concentration, compositions with lime and fly ash concentrations near the low end of the respective allowable ranges should be avoided.

For example, in one instance with high concentrations of both water (moisture content about 42%) and non-chemically treated digested sewage sludge solids (about 18%), compositons with acceptable compressive strength in landfill applications have been found to require at least 55% fly ash and 2% lime, with the inclusion of 1% calcium sulfate also highly preferred. At 50% moisture content and 20% sludge solids, even higher fly ash and lime levels may be required. This will depend of course on a number of variables including the chemical and physical characteristics of the sludge and fly ash (which will vary depending on source and methods of treatment or production), reactivity and absortivity of other materials in the mix, and the curing times and compressive strength required in the final product.

The compositions of the present invention may be improved, particularly with respect to early hardening characteristics, by the incorporation therein of calcium sulfate or some other reactive alkaline earth metal sulfate. Due to its relatively low cost and availability, gypsum or calcium sulfate dihydrate is preferable in an amount sufficient to provide the molar equivalency of 1 to 10% (by weight solids) calcium sulfate anhydrite. More preferably, this is within the range 1.5 – 3%. If other alkaline earth metal sulfates are used, such as magnesium sulfate, they should be kept within ranges equivalent, on a molar basis, to the specified weight % ranges for calcium sulfate anhydrite.

In one of the preferred compositions and treatment processes of the present invention, the admixture includes soil (ordinary dirt, sand, gravel or other solid, non-monolithic naturally occurring materials from the earth's crust) and the admixture is placed in a space open to the atmosphere, as a land fill material. This material generally requires some compaction prior to hardening, particularly at moisture contents of about 35% and below. Such soil may be present to the extent of 10–60 (weight % of solids) and preferably comprises 20–45% of the solids in the composition. Obviously, this soil may be incorporated in the admixture in a mill or plant. Alternatively, the soil may be incorporated by adding the mixture to a soil base and mixing in situ. Various other materials, such as aggregate, may also be incorporated in the admixture of the present invention.

In the following tables, 1–5, a variety of lime/fly ash/sewage compositions are listed along with their product characteristics to show their utility as land fill or hardenable structural materials. The methods of the present invention may involve use of such compositions to the extent such compressive strengths or other characteristics are required. It should be noted that minimum compressive strengths of 13–20 PSI are required for land fill applications while road base materials should exceed about 300 PSI in compressive strength.

It should also be noted that Table 3 refers to "waste cement dust". Such cement kiln dust generally includes significant concentrations of reactive, hydratable alkaline earth metal oxides, and therefore functions in the present inventions as a lime reactant or substitute.

Table 4 refers to similar compositions using "waste lime" as the lime material. This waste lime is the dust of a conventional lime kiln and includes significant amounts of hydratable alkaline earth metal oxides.

TABLE 1

LIME/FLY ASH/SEWAGE COMPOSITIONS

| Mix | % Dolomitic Monohydrated Lime | % Sewage (wet) | % Fly Ash | % Moisture | Compressive Strength (PSI) of 4" Cylinders | |
|---|---|---|---|---|---|---|
| | | | | | Cured 2 Days at 100° F. | Cured 7 Days at 100° F. |
| 1 | 3 | 30 | 67 | 15 | 58 | — |
| 2 | 3 | 30 | 67 | 24.6 | 58 | 100 |
| 3 | 6 | 30 | 64 | 15 | 60 | — |

TABLE 2

LIME/FLY ASH/SULFATE/SEWAGE COMPOSITIONS

| Mix | % Dolomitic Monohydrated Lime | % Sewage (wet) | % Fly Ash | % Calcium Sulfate Anhydrite Waste | % Moisture | Compressive Strength (PSI) of 4' Cylinders | | | | | |
|---|---|---|---|---|---|---|---|---|---|---|---|
| | | | | | | 2 Days 100° F. | 2 Days 73° F. | 7 Days 100° F. | 7 Days 130° F. | 7 Days 73° F. | 28 Days 73° F. |
| 1 | 3 | 30 | 64 | 3 | 15 | 50 | — | — | — | — | — |
| 2 | 3 | 30 | 64 | 3 | 30.6 | 50 | — | 142 | — | — | — |
| 3 | 6 | 30 | 61 | 3 | 15 | 80 | — | — | — | — | — |
| 4 | 6 | 30 | 61 | 3 | 25.7 | 80 | — | 452 | — | — | — |
| 5 | 6 | 30 | 61 | 3 | 28.6 | — | — | 251 | 239 | — | — |
| 6 | 6 | 30 | 61 | 3 | 29.9 | — | 36 | — | — | 102 | 298 |
| 7 | 4 | 30 | 64 | 2 | 29.9 | — | 36 | — | — | 108 | 195 |
| 8 | 3 | 30 | 65.5 | 1.5 | 29.3 | — | 36 | — | — | 71 | 171 |
| 9 | 2 | 30 | 66 | 2 | 25.4 | — | — | — | — | 87 | 219 |

TABLE 3

CEMENT KILN DUST COMPOSITIONS

| Mix | % Waste Cement Dust | % Sewage (wet) | % Fly Ash | % Moisture | Compressive Strength (PSI) of 4" Cylinders | |
|---|---|---|---|---|---|---|
| | | | | | 2 Days at 73° F. | 28 Days at 73° F. |
| 1 | 3 | 30 | 67 | 31.1 | 24 | 26 |
| 2 | 6 | 30 | 64 | 31.1 | 32 | 32 |

TABLE 4

WASTE LIME COMPOSITIONS

| Mix | Type of Waste Lime | % Waste Lime | % Dolomitic Monohydrated Lime | % Sewage (wet) | % Fly Ash | % Calcium Sulfate Anhydrite Waste | % Moisture | Compressive Strength Of 4" Cylinders | |
|---|---|---|---|---|---|---|---|---|---|
| | | | | | | | | 7 Days 73° F. | 28 Days 73° F. |
| 1 | Dolomitic | 10 | — | 30 | 57 | 3 | 23.2 | 56 | 333 |
| 2 | Dolomitic | 8 | — | 30 | 59 | 3 | 24.3 | 52 | 299 |
| 3 | Dolomitic | 6 | — | 30 | 61 | 3 | 24.5 | 44 | 202 |
| 4 | High Calcium | 3 | — | 30 | 65.5 | 1.5 | 26.1 | 164 | 329 |
| 5 | Dolomitic | 3 | — | 30 | 65.5 | 1.5 | 25.6 | 162 | 368 |
| 6 | Dolomitic | 6 | — | 30 | 62.5 | 1.5 | 28.5 | 48 | 90 |

TABLE 5

SOIL COMPOSITIONS

| Mix | % Dolomitic Monohydrated Lime | Type of Waste Lime | % Waste Lime | % Calcium Sulfate Waste Anhydrite | % Moisture | % Sewage (wet) | % Fly Ash | % Soil (wet) | Compressive Strength (PSI) of 4" Cylinders | |
|---|---|---|---|---|---|---|---|---|---|---|
| | | | | | | | | | 7 Days 73° F | 28 Days 73° F |
| 1 | 3 | — | — | 1.5 | 30.8 | 30 | 22 | 43.5 | 36 | 88 |
| 2 | 3 | — | — | 1.5 | 32.9 | 30 | 43.5 | 22 | 66 | 255 |
| 3 | 3 | — | — | 1.5 | 36.0 | 30 | 32.5 | 33 | 54 | 119 |
| 4 | — | 50% High Calcium 50% Dolomitic | 3 | 1.5 | 35.6 | 30 | 32.5 | 33 | 52 | 108 |
| 5 | — | High Calcium | 3 | 1.5 | 39.3 | 30 | 22 | 43.5 | 21 | 36 |
| 6 | — | High Calcium | 6* | 3 | 32.5 | 30 | 22 | 43.5 | 20 | 21 |
| 7 | — | High Calcium | 3* | 1.5 | 41.0 | 30 | 22 | 43.5 | 8 | 15 |

*Waste Lime had been stock piled at plant for some period of time.

As an example of one typical and preferred use of the present invention, ponded digested primary municipal sewage sludge of various ages (having been ponded for periods of anywhere from a few weeks to decades) is combined in an admixture consisting of 31.3% wet sewage sludge (the various source ponds producing materials consisting of from 13 to 33% sewage sludge solids), 31.3% fly ash, 31.3% soil, 3% lime, and 3% calcium sulfate anhydrite. This material is mixed and then emplaced and compacted in a part of the area previously occupied by the ponded sludge. After a period of time wherein this admixtue is exposed to the atmosphere, it hardens to a compressive strength well above that required for use as a land fill. The resulting product is suitable to serve as a landfill for the purpose of providing a support for a road way, over which modern expressways may be constructed. This hardened composition has been tested on a laboratory basis and appears to be free of undesirable leaching characteristics.

Tests of comparable mixtures have resulted in the following results:

Summary of Test Results on Treatment of Ponded Sewage Sludge and Production of Hardened Land Fill Material Therefrom 1. Compressive Strength Results - 73° F.
   Cured in sealed cans:
      3 days - 41 PSI
      7 days - 86 PSI
     14 days - 167 PSI
     28 days - 338 PSI
2. California Bearing Ratio - not soaked
   Cured 73° F. in sealed plastic bags:
     Immediate - 4
      3 days - 20
      7 days - 93
     14 days - 95
3. Permeability - cured 73° F. in saturated condition
      3 days 1.88 × 10$^{-5}$ cm/sec
      9 days - 1.28 × 10$^{-6}$ cm/sec
     26 days - 1.22 × 10$^{-7}$ cm/sec The dramatic and surprising results obtained in making construction material from sewage sludge are further illustrated by certain leaching test results on the foregoing test material. In these leaching tests, a 500 gram monolithic sample of hardened sample material was shaken with 2000 milliliters of de-ionized water for 48 hours. The sample was then filtered and the filtrate analyzed for metal ions, bacteriological activity, et cetera.

With respect to bacteriological activity, the de-ionized water, as a test control had plate form, coliform and fecal form counts of 110, 23 and 0, respectively, while the leach test filtrate had comparable counts of 3600, 23 and 0. Thus, no increase in coliform or fecal bacteria was noted in the leachate.

With respect to metal ions, Table 6 lists the range of certain metal ion contents observed in a series of tests of the sludge used in the foregoing test compositions along with the contents of these same ions in leachate (based on the leaching test just described) from three samples of the foregoing test composition, each tested at several stages of cure:

TABLE 6

| | (All contents in parts per million) | | | | | |
|---|---|---|---|---|---|---|
| | Zn | Cu | Cr | Pb | Cd | Hg |
| SLUDGE | 2340-4410 | 674-926 | 929-1730 | 805-2280 | 18-33 | 92-233 |
| Sample A | | | | | | |
| 24 hrs. cure | <0.01 | 1.6 | 0.03 | 0.02 | <0.01 | <0.001 |
| 7 days cure | <0.01 | 1.4 | <0.01 | <0.01 | <0.01 | <0.001 |
| 28 days cure | <0.01 | 0.64 | <0.01 | <0.01 | <0.01 | <0.001 |
| Sample B | | | | | | |
| 24 hrs. cure | <0.01 | 1.0 | 0.03 | 0.03 | <0.01 | <0.001 |
| 7 days cure | <0.01 | 1.3 | <0.01 | <0.01 | <0.01 | <0.001 |
| 28 days cure | <0.01 | 0.8 | <0.01 | <0.01 | <0.01 | <0.004 |
| Sample C | | | | | | |
| 24 hrs. cure | 0.01 | 20 | 0.05 | 0.01 | 0.01 | 0.001 |
| 7 days cure | 0.01 | 12 | 0.01 | <0.01 | 0.01 | 0.001 |
| 28 days cure | <0.01 | 1.3 | <0.01 | <0.01 | <0.01 | 0.006 |

In further test ponded digested sewage sludge from Lagoon D of the southwest Philadelphia treatment plant (including 21-25% sludge solids) was tested in a variety of mixes with fly ash from the mechanical collection system of the Eddystone Plant of the Philadelphia Electric Company and the Titus Station plant of the Metropolitan Edison Company of Reading, Pa. Soil was included in the compositions in some of these tests. The soil, as indicated, was either overburden from a limestone quarry of the G. & W. H. Corson Company, at Plymouth Meeting, Pennsylvania, or sand and/or gravel from Penn's Grove, Pa., as supplied by the Pennsylvania Department of Transportation. The lime used in these tests was a hydrated, dolomitic lime of the G. & W. H. Corson Company. Other waste material included in some of these compositions were incinerator residue from the Marple Township Refuse Incinerator at Lawrence Park, Pa., lime dust, some fresh and some stockpiled, from the Annville, Pennsylvania plant of Bethlehem Steel and calcium sulfate anhydrite produced as an industrial by-product at Paulsboro, N.J.

In these various tests for compressive strength, moisture content and density of the sample was determined at the time of sample preparation. Test specimens were made in standard Proctor molds using a 5.5 pound hammer, 3 layers of sample material compressed with 25 blows per layer. These samples were cured in sealed cans and then soaked in water for four hours before compressive strength testing.

In a first series of tests in this test program, several compositions were prepared, each including 20% sludge, the sludge including 21% sewage sludge solids, fly ash in the range 35-40%, and soil, specifically Corson overburden containing 23% water, in a range of 35-40%. The variables in this series were lime, including lime type material from waste by-product dust, and calcium sulfate anhydrite. The results in this series are shown in Table 7.

TABLE 7

| MATERIALS | Sample No. 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| | | | | (% BY WEIGHT) | | | | | | | | | | |
| Lime | 1 | 1 | 1 | | | | 1 | 1 | 1 | 1 | | | | |
| Annville Dust (dry) | | | 2 | 2 | 4 | 2 | | | | | | | | |
| Annville Dust (stock piled) | | | | | | | 4 | 6 | 4 | 6 | 4 | 6 | 4 | 6 |
| Anhydrite | | 1 | | | 1 | | | | 1 | 1 | | | 1 | 1 |
| Sludge | 20 | 20 | 20 | 20 | 20 | 20 | 20 | 20 | 20 | 20 | 20 | 20 | 20 | 20 |
| Fly Ash (dry) | 39.5 | 39 | 38.5 | 39 | 38 | 38.5 | 37.5 | 36.5 | 37 | 36 | 38 | 37 | 37.5 | 36.5 |
| Corson Overburden | 39.5 | 39 | 38.5 | 39 | 38 | 38.5 | 37.5 | 36.5 | 37 | 36 | 38 | 37 | 37.5 | 36.5 |
| Dry Unit Wt. lbs./ft$^3$ | 79.9 | 78.6 | 82.0 | 81.0 | 81.0 | 81.2 | 80.9 | 79.1 | 82.8 | 79.5 | 80.8 | 82.1 | 80.9 | 80.2 |
| Moisture Content | 31.6 | 32.5 | 27.8 | 27.8 | 29.6 | 28.5 | 30.4 | 31.6 | 28.3 | 33.0 | 29.7 | 29.6 | 30.5 | 31.3 |
| Compressive Strength (PSI) Age at Test at Temp. | | | | | | | | | | | | | | |
| 2 Days at 130° F. | 34 | 32 | | F* | F | F | 40 | 48 | 72 | 92 | 36 | 36 | 30 | 44 |
| 7 Days at 130° F. | 39 | 30 | | F | F | F | 52 | 60 | 76 | 80 | 38 | 32 | 32 | 52 |
| 7 Days at 73° F. | 30 | — | | F | F | F | 49 | 46 | 64 | — | 44 | 52 | 38 | 48 |
| 28 Days at 73° F. | 36 | 36 | | F | F | F | 64 | 50 | 107 | 68 | 40 | 44 | 48 | 70 |

*F Sample Slumped on Soaking, probably due to insufficient reactive alkaline earth hydroxide or hydratable alkaline earth oxide.

Samples 4, 5 and 6 obviously did not produce sufficient compressive strength. This demonstrates the need for a certain minimum of reactive lime materials. The dry waste Annville dust is apparently hard burned, and therefore unreactive. In contrast, samples 11-14 utilized stock piled Annville dust as a lime source and satisfactory compressive strengths were realized. This is thought to be attributable to the weathering effect, during stock piling, on the Annville dust. Note that lime, as such, was not added in any of the compositions identified as samples 4-6 and 11-14.

Another series of tests was conducted with sand as the inert aggregate, the range of compositions being otherwise similar to that in the previous series. Except in two instances in which fly ash contents of 20 and 15 percent, respectively, were tested (see samples number 6 and 7 in Table 8, below); in these two specific tests, compressive strengths were such that the compositions would be considered of only marginal utility in the applications of interest in the present invention. The results of these tests are otherwise reported in Table 8, below.

TABLE 8

| Sample No. | 1 | 2 | 3 | 4 | 5 | 6 | 7 | 8 | 9 | 10 | 11 | 12 |
|---|---|---|---|---|---|---|---|---|---|---|---|---|
| | | | | (% BY WEIGHT) | | | | | | | | |
| Lime | 1 | | 1 | 1 | 1 | 1 | 1 | 1 | 1 | 1 | 1 | 1 |
| Annville Dust dry | | | | | | | | | | | | |
| Annville Dust (Stock-piled) | 4 | 4 | 2 | 4 | 4 | 4 | 4 | 4 | 4 | 4 | 4 | 4 |
| Anhydrite | | | | | | | | | | | | |
| Sludge (21% solids) | 20 | 20 | 30 | 20 | 20 | 20 | 20 | 20 | 20 | 20 | 20 | 20 |
| Fly Ash (Eddystone B dry) | 37.5 | 38 | 38.5 | 30 | 25 | 20 | 15 | 25 | 25 | 25 | 30 | 30 |
| PennDOT Sand at 5% H$_2$O | 37.5 | 38 | 38.5 | 45 | 50 | 55 | 60 | 50 | 50 | 50 | 45 | 45 |
| Dry Unit Wt. lbs/ft$^3$ | 84.7 | 84.4 | 83.7 | 82.5 | 92.0 | 91.0 | 94.4 | 88.9 | 88.6 | 91.5 | 90.6 | 89.2 |
| Moisture content | 23.0 | 24.1 | 28.3 | 33.6 | 22.0 | 25.1 | 24.3 | 24.9 | 21.7 | 11.6 | 24.0 | 16.9 |
| Compressive Strength PSI age at Test and Temperature | | | | | | | | | | | | |
| 2 Days at 130° F. | 40 | 36 | 22 | 12 | 24 | 12 | 10 | 6 | 30 | 44 | 22 | 48 |
| 7 Days at 73° F. | 36 | 32 | 32 | 8 | 24 | 10 | 12 | 10 | 60 | 44 | 16 | 42 |
| 7 Days at 73° F. | 44 | 34 | 34 | 12 | 26 | — | 10 | 16 | 34 | 36 | 32 | 46 |
| 28 Days at 73° F. | 46 | *52 | 36 | *26 | 32 | *12 | *14 | 24 | 30 | 36 | 26 | 45 |

| Sample No. | 13 | 14 | 15 | 16 | 17 | 18 | 19 | 20 | 21 | 22 | 23 | 24 |
|---|---|---|---|---|---|---|---|---|---|---|---|---|
| Lime | 1 | | | | | 1 | 0.5 | 0.5 | | 0.5 | 0.5 | |
| Annville Dust (dry) | | | | | | | | | 4 | 2 | | |
| Annville Dust (stock-piled) | 4 | 4 | 4 | 2 | 2 | | 2 | 4 | | | 4 | 4 |
| Anhydrite | 1 | 1 | 2 | 2 | 1 | 1 | 0.5 | 0.5 | 1 | 0.5 | 0.5 | 1 |
| Sludge (21% solids) | 20 | 20 | 20 | 20 | 20 | 20 | 20 | 20 | 20 | 20 | 20 | 20 |
| Fly Ash (Eddystone B dry) | 37 | 37.5 | 37 | 38 | 38.5 | 39 | 38.5 | 37.5 | 37.5 | 38.5 | ***37.5 | 37.5 |
| PennDOT Sand at 5% H$_2$O | 37 | 37.5 | 37 | 38 | 38.5 | 39 | 38.5 | 37.5 | **37.5 | **38.5 | **37.5 | 37.5 |
| Dry Unit Wt. lbs/ft$^3$ | 97.3 | 101.4 | 99.4 | 100.4 | 99.3 | 98.3 | 98.5 | 96.5 | 95.5 | 99.5 | 86.5 | 81.5 |
| Moisture content 17.3 | 16.5 | 16.8 | 17.6 | 17.6 | 18.5 | 16.2 | 17.0 | 14.8 | 15.8 | 25.5 | 31.0 | |
| Compressive Strength PSI age at Test and Temperature | 95 | 54 | — | 40 | 36 | — | 34 | 38 | 44 | 44 | 40 | 24 |
| 2 Days at 130° F. | 187 | 56 | 52 | 32 | 36 | 125 | 44 | 40 | 36 | 64 | 26 | 52 |
| 7 Days at 73° F. | 115 | 48 | 42 | 40 | 40 | — | 36 | 50 | 40 | 42 | 32 | 56 |
| 7 Days at 73° F. | 147 | 92 | 89 | 63 | 82 | 63 | 68 | 99 | 48 | 72 | 84 | 68 |

TABLE 8-continued

28 Days at 73° F.

*18 day Break;
**Dry PennDOT Sand;
***Wet Fly Ash (10%)

In the foregoing table, samples 11 and 12 are seen to include substantially higher sand contents with no apparent effect on compressive strength. Compositions with as little as 5% lime and 2% dry Annville dust, together with 0.5% calcium sulfate anhydrite, produce mixes with compressive strength in useful ranges. In this respect, reference is made to sample numbers 19 and 22.

In still another series of tests, sludge and water contents near the upper end of the useful composition range of the present invention were tested. As shown in Table 9, at 39 and 50.4% moisture content, respectively, and 40 and 50% sludge concentration (sludge, 45% solids; or 18 and 22.5% sludge solids concentration in the total composition) respectively, samples 2 and 3 were seen to be marginal with only 1% lime content. At comparable lime and sludge contents, however, samples 5 and 6 were seen to be satisfactory and marginal, respectively, with 2% lime. At this time, it is believed that these represent the upper limits of the useful compositions of the present invention insofar as non-chemically treated sludge and water content is concerned. It should again be noted that at or near the upper limits of the sludge and water ranges, relatively high fly ash and lime contents are necessary to effect stabilization by virtue of the lime-fly ash or lime-fly ash-sulfate reaction. The effect of substituting incinerator residue for some or all of the fly ash content in mixtures of the present invention can be seen from the data listed for still another series of tests set forth in Table 10 below, in which it is seen that even at 0% fly ash with 40% incinerator residue and above, mixtures with useful properties in terms of compressive strengths are produced (refer specifically in this case to samples 10, 11 and 12).

TABLE 9

| | (% BY WEIGHT) | | | | | |
|---|---|---|---|---|---|---|
| Sample No. | 1 | 2 | 3 | 4 | 5 | 6 |
| Lime | 1 | 1 | 1 | 2 | 2 | 2 |
| Hi Cal-Annville Dust | | | | | | |
| Hi Cal-Annville Dust stock piled | | | | | | |
| Anhydrite (Paulsboro) | 1 | 1 | 1 | 1 | 1 | 1 |
| Sludge (45% solids) | 30 | 40 | 50 | 30 | 40 | 50 |
| Fly Ash (Titus Station) | *68 | *58 | *48 | *67 | *57 | *47 |
| Dry Unit Wt. (lbs/ft$^3$) | 76 | 71.8 | 63.5 | 66.7 | 66.4 | 61.2 |
| Moisture Content | 32 | 39 | 50.4 | 33.0 | 42.0 | 51.4 |
| Compressive Strength PSI Age of Test and Temp. | | | | | | |
| 2 Days at 130° F. | 28 | **F | 4 | 66 | 32 | 5 |
| 7 Days at 130° F. | — | — | — | — | — | — |
| 7 Days at 73° F. | 32 | F | 6 | 48 | 28 | 8 |
| 28 Days at 73° F. | 60 | 20 | 0 | 64 | 52 | 6 |

*Fly Ash at 10% moisture content
**F Sample Slumped on Soaking

TABLE 10

| | (% BY WEIGHT) | | | | | | | | | | | |
|---|---|---|---|---|---|---|---|---|---|---|---|---|
| Sample No. | 1 | 2 | 3 | 4 | 5 | 6 | 7 | 8 | 9 | 10 | 11 | 12 |
| Lime | 2 | 2 | 2 | 2 | 2 | 2 | 1 | 1 | 1 | 1 | 1 | 2 |
| Hi Cal-Annville Dust | | | | | | | 4 | 4 | 4 | 4 | 4 | 4 |
| Hi Cal-Annville Dust stock piled | | | | | | | | | | | | |
| Anhydrite | 1 | 1 | 1 | 1 | 1 | 1 | 1 | 1 | 1 | 1 | 1 | 1 |
| Sludge (25% solids) | 25 | 25 | 25 | 25 | 25 | 25 | 20 | 20 | 20 | 20 | 20 | 20 |
| Fly Ash (Titus Station) | *52 | *42 | *32 | *52 | *42 | *32 | 30 | 20 | 10 | 0 | 0 | 0 |
| Incinerator Residue | **20 | **30 | **40 | ***20 | ***30 | ***40 | 10 | 20 | 30 | 40 | 74 | 73 |
| Dry Unit Wt (lbs/ft$^3$) | 71.5 | 72.4 | 87.1 | 72.1 | 80.7 | 79.6 | 84.3 | 86 | 85 | 86.3 | 77.7 | 78.6 |
| Moisture Content | 25.8 | 28.0 | 24.6 | 42 | 30 | 31.3 | 28.5 | 28.1 | 31.1 | 30.2 | 34.5 | 29.4 |
| Compressive Strength PSI Age at Test and Temp. | | | | | | | | | | | | |
| 2 Days at 130° F. | 42 | 34 | 26 | — | 32 | 36 | 16 | 39.8 | 16 | 20 | 8 | 20 |
| 7 Days at 130° F. | — | — | — | 80 | — | — | 44 | 40 | 36 | 20 | 28 | 40 |
| 7 Days at 73° F. | 44 | 28 | 47 | — | 36 | 44 | 52 | 44 | 36 | 28 | 28 | 44 |
| 28 Days at 73° F. | 68 | 44 | 57 | 74 | 52 | 66 | 56 | 40 | 30 | 24 | 30 | 44 |

*Fly Ash at 10% Moisture Content;
**5 year old Incinerator Residue at 20% Moisture Content
***1 year old I.R. at 20% Moisture Content In one other series of tests, the data from which are listed in Table 11, 33% moisture content, uncompacted mixtures were permitted to sit at atmospheric conditions for periods of time from 0 days to 28 days without compaction and then compacted and later tested at 7 and 28 days after compaction and test. The purposes of this test was to demonstrate that the compositions of the present invention in a useful waste disposal process could be prepared and stock piled for a period of time before use. During such stock piling, some of the reactants are consumed and (in the absence of compaction) do not produce a strength-contributing matrix. Therefore in such stock piling situations, higher proportions of reactants are required. Thus it will be noticed in Table 11 that compositions with insufficient lime (sample number 1) were marginal even if compacted immediately after mixing while others were able to develop significant compressive strength even if stock piled up to 28 days.

TABLE 11

| | (% BY WEIGHT) | | | |
|---|---|---|---|---|
| Sample No. | 1 | 2 | 3 | 4 |
| Wet Fly Ash | 37.5 | 37 | 37.5 | 38 |
| Sand and Gravel | 37.5 | 37 | 37.5 | 38 |

TABLE 11-continued

| Sample No. | (% BY WEIGHT) | | | |
|---|---|---|---|---|
| | 1 | 2 | 3 | 4 |
| Lime | 0 | 1 | 2 | 3 |
| Wet Annville Dust | 4 | 4 | 2 | 0 |
| Anhydrite | 1 | 1 | 1 | 1 |
| Sludge | 20 | 20 | 20 | 20 |
| Dry Unit Weight | | | | |
| Moisture | | | | |
| 0 Days | 78.6/33 | 78/34.3 | 78.6/32.5 | 78.7/32.5 |
| 3 Days | 78.0/33 | 80.4/31.3 | 79.4/32.7 | 80.5/31.8 |
| 7 Days | 75.5/31.7 | 81.8/27.8 | 83.0/27.4 | 81.5/30.5 |
| 14 Days | 81.9/28.3 | 82.8/29.0 | 81.9/29.6 | 82.1/29.1 |
| 28 Days | 79.5/32.3 | 82.5/29.1 | 81.4/30.3 | 74.0/30.4 |

TABLE 11

PART II

| PERIOD PRIOR TO COMPACTION | CURING CONDITIONS AFTER COMPACTION Time-Temp. | Sample No. | | | |
|---|---|---|---|---|---|
| | | 1 | 2 | 3 | 4 |
| 0 Days | | | | | |
| | 7 Days 130° | 8 | 30 | 56 | 96 |
| | 28 Days 73° | 50 | 60 | 80 | 80 |
| 3 Days | | | | | |
| | 7 Days 130° | F | 26 | 44 | 86 |
| | 28 Days 73° | 6 | 30 | 40 | 72 |
| 7 Days | | | | | |
| | 7 Days 130° | 6 | 24 | 44 | 96 |
| | 28 Days 73° | 6 | 30 | 44 | 76 |
| 14 Days | | | | | |
| | 7 Days 130° | F | 12 | 36 | 80 |
| | 28 Days 73° | 6 | 20 | 40 | 64 |
| 28 Days | | | | | |
| | 7 Days 130° | 8 | 24 | 32 | 32 |
| | 28 Days 73° | | | | |

From the foregoing, it can be seen that the present invention provides a novel and unique, as well as economically and ecologically acceptable, method of disposing of and reusing the sludge product from a municipal sewage treatment plant. Moreover, it has been shown that the products and methods of this invention may be highly useful in reclaiming land, preventing further environmental damage and correcting past environmental damage. It should also be appreciated that while this invention has been described with respect to particular compositions and examples, it is not necessarily limited thereto. It is intended that the appended claims be construed so as to encompass the invention in its true spirit and scope including possible variations and modifications thereof as may be apparent to those skilled in this art.

We claim:

1. A water-solids mixture hardenable under atmospheric conditions the dry solids of which comprise (based on weight % of dry solids):
   1-15% lime
   1-50% digested sewage sludge solids
   20-90% fly ash, and the water of which provides a moisture content (based also on weight % dry solids) of 5-50%.

2. A water-solids mixture hardenable under atmospheric conditions, as recited in Claim 1, wherein said moisture content is 15-30% and said dry solids comprise:
   2-6% lime
   8-20% digested sewage sludge solids
   30-80% fly ash.

3. A water-solids mixture hardenable under atmospheric condition, as recited in claim 1, wherein said mixture further includes:
   1-10% calcium sulfate anhydrite (based on weight % of solids).

4. A water-solids mixture hardenable under atmospheric condition, as recited in claim 2, further including: 1.5 - 3% calcium sulfate anhydrite (based on weight % solids).

5. A water-solids mixture hardenable under atmospheric condition, as recited in claim 3, further including: 10-60% soil (based on weight % solids).

6. A water-solids mixture hardenable under atmospheric condition, as recited in claim 4, further including: 20-45% soil (based on weight % solids).

7. Method of treating a sludge from a municipal sewage plant comprising admixing said sludge with lime and fly ash such that the final composition of said admixture has a moisture content of 5-50% and the dry solids therein comprise:
   1-15% lime
   1-50% digested sewage sludge solids
   20-90% fly ash, and
permitting said admixture to harden under atmospheric conditions.

8. Method, as recited in claim 7, wherein an alkaline earth sulfate is also included in said admixture, the amount of said sulfate in said admixture to be the molar equivalent of 1-10% (by weight solids) calcium sulfate anhydrite.

9. Method, as recited in claim 8, wherein soil is also included in said admixture, said soil comprising 10-60% of said solids.

10. Method, as recited in claim 7, wherein said moisture content is below 35% and said admixture is compacted after placement and before being permitted to harden.

11. Method, as recited in claim 7, wherein calcium sulfate and soil are included in said admixture, and comprise, respectively, 1.5-1.5-% (based on calcium sulfate anhydrite) and 20-45% of the solids thereof.

12. Method, as recited in claim 11, wherein said moisture content is below 35% and said admixture is compacted after placement and before being permitted to harden.

13. Hardened composition comprising the reaction product of the mixture of claim 7.

14. Hardened composition comprising the reaction product of the mixture of claim 11.

15. Hardened composition comprising the reaction product of the mixture of claim 9.

16. Method of making a load bearing material from a municipal sewage plant sludge, said method comprising admixing said sludge with lime and fly ash such that the final composition has a moisture content of 5-50%, and further comprises 1-15% lime, 1-50% digested sewage sludge solids, and 20-90% fly ash (all percentages based on weight % of solids) and permitting said admixture to harden under atmospheric conditions.

17. Method, as recited in claim 16, wherein an alkaline earth sulfate is also included in said admixture, the amount of said sulfate in said admixture to be the molar equivalent of 1–10% calcium sulfate anhydrite.

18. Method, as recited in claim 17, wherein soil is also included in said admixture, said soil comprising 10–60% of the solids of said admixture.

19. Method, as recited in claim 16, wherein calcium sulfate and soil are included in said admixture, and comprise, respectively, 1.5 — 3% (based on calcium sulfate anhydrite) and 20–40% of the solids thereof.

20. A water-solid mixture hardenable under atmospheric conditions, the dry solids of which comprise (based on weight % of dry solids):
   1–15% lime or a molar equivalent amount of hydratable alkaline earth oxide or alkaline earth metal hydroxide in a lime substitute selected from the group consisting of BOF dust, lime kiln dust or cement kiln dust,
   1–50% digested sewage sludge solids,
   20–90% fly ash, or an equivalent amount of a fly ash substitute selected from the group consisting of siliceous incineration residue, "alum" water treatment plant waste, or "red mud" by-product of a bauxite reduction process, and
   waer sufficient to provide a moisture content (based on weight % of dry solids) of 5–50%, the combination of said materials being cementitiously hardenable under atmospheric conditions.

21. A water-solids mixture hardenable under atmospheric conditions, the dry solids of which comprise (based on weight % of dry solids):
   1–15% lime or a lime substitute providing a molar equivalent amount of hydratable alkaline earth oxide or alkaline earth metal hydroxide, said lime substitute comprising BOF dust, cement kiln dust, lime kiln dust, alkaline earth metal oxide or alkaline earth metal hydroxide,
   1–15% digested sewage sludge solids,
   1–10% calcium sulfate anhydrite or other alkaline earth metal sulfates in an amount equal to 1–10% calcium sulfate anhydrite on a molar basis,
   20–90% fly ash or an equivalent amount of another waste material having pozzolanic activity selected from the group consisting of siliceous incineration residue, "alum" water treatment plant waste, or "red mud" by-product of a bauxite reduction process, and
   water sufficient to provide a moisture content (based on weight % of dry solids) of 5–50%, the combination of said materials being cementitiously hardenable under atmospheric conditions.

22. Method of treating a sludge from a municipal sewage treatment plant comprising admixing said sludge with lime or a lime substitute material selected from the group consisting of BOF dust, lime kiln dust, cement kiln dust, hydratable alkaline earth metal oxide and alkaline earth metal hydroxide, and a pozzolanic reactant selected from the group consisting of fly ash, siliceous incineration residue, "alum" water treatment plant waste, and "red mud" by-product of a bauxite reduction process such that the final composition of said admixture has a moisture content of 5–50% (based on weight % of solids) and a dry solids content (based on weight % solids) comprising:
   1–15% lime or a lime substitute providing a molar equivalent amount of alkaline earth metal hydroxide, or hydratable alkaline earth oxide,
   1–50% digested sewage sludge solids,
   20–90% fly ash or "fly ash equivalent amounts" of said pozzolanic reactant and permitting said admixture to harden under atmospheric conditions.

23. Method, as recited in claim 22, wherein said mixture includes 20–90% fly ash.

24. Method, as recited in claim 22, wherein said mixture includes 1–15% lime.

25. Method, as recited in cliam 22, wherein said mixture further includes alkaline earth metal sulfate in an amount which is the molar equivalent of 1–10% calcium sulfate anhydrite.

26. A water-solids mixture, hardenable under atmospheric conditions, as recited in claim 1, further including: 10–60% soil (based on weight % solids).

27. A water-solids mixture, hardenable under atmospheric conditions, as recited in claim 2, further including: 20–45% soil (based on weight % solids).

28. Method, as recited in claim 7, wherein soil is also included in said admixture, said soil comprising 10–60% of said solids.

29. Method, as recited in claim 7, wherein soil is included in said admixture and comprises 20–45% of the solids thereof.

30. Method, as recited in claim 29, wherein said moisture content is below 35% and said admixture is compacted after placement and before being permitted to harden.

31. Hardened composition comprising the reaction product of the mixture of claim 28.

32. Method, as recited in claim 16, wherein soil is also included in said admixture, said soil comprising 10–60% of the solids of said admixture.

* * * * *

UNITED STATES PATENT OFFICE
CERTIFICATE OF CORRECTION

PATENT NO. : 4,028,130
DATED : June 7, 1977
INVENTOR(S) : William C. Webster and Robert G. Hilton It is certified that error appears in the above-identified patent and that said Letters Patent are hereby corrected as shown below:

Page 1, Item [75] Inventors: delete "Ronald F. Cotts"

Column 4, line 21, after "silica" insert a comma ",".

Table 8 (lower half), to the right of "Moisture Content", the numbers in each of the columns should be, respectively, "17.3, 16.5, 16.8, 17.6, 17.6, 18.5, 16.2, 17.0, 14.8, 15.8, 25.5 and 31.0".

Table 8 (lower half), line under "Moisture Content", delete in its entirety.

UNITED STATES PATENT OFFICE
CERTIFICATE OF CORRECTION

Patent No. 4,028,130     Dated   June 7, 1977

Inventor(s)  William C. Webster et al.

It is certified that error appears in the above-identified patent and that said Letters Patent are hereby corrected as shown below:

Table 8 (lower half), after "PSI  age at Test and" insert
-- Temp -- and change the last four lines in the first column to read,

```
     -- 2 days at 130°F.
        7 days at  73°F.
        7 days at  73°F.
       28 days at  73°F. --.
```

Signed and Sealed this

Fourth Day of October 1977

[SEAL]

Attest:

RUTH C. MASON
Attesting Officer

LUTRELLE F. PARKER
Acting Commissioner of Patents and Trademarks